(12) United States Patent
Kinstler

(10) Patent No.: US 7,645,348 B2
(45) Date of Patent: *Jan. 12, 2010

(54) REPAIR PROCESS

(75) Inventor: Monika D. Kinstler, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/118,795

(22) Filed: May 12, 2008

(65) Prior Publication Data

US 2008/0210340 A1    Sep. 4, 2008

Related U.S. Application Data

(62) Division of application No. 11/292,743, filed on Dec. 2, 2005, now Pat. No. 7,387,690, which is a division of application No. 10/608,359, filed on Jun. 26, 2003, now Pat. No. 7,017,793.

(51) Int. Cl.
*B23K 35/34* (2006.01)
*C22C 19/05* (2006.01)

(52) U.S. Cl. .................. 148/24; 228/248.1; 420/451; 420/460

(58) Field of Classification Search ............... None
See application file for complete search history.

(56) References Cited

U.S. PATENT DOCUMENTS

| | | | | |
|---|---|---|---|---|
| 4,008,844 A | * | 2/1977 | Duvall et al. | 228/119 |
| 4,478,638 A | * | 10/1984 | Smith et al. | 75/255 |
| 4,705,203 A | * | 11/1987 | McComas et al. | 228/119 |
| 5,240,491 A | * | 8/1993 | Budinger et al. | 75/255 |
| 5,437,737 A | | 8/1995 | Draghi et al. | |
| 5,628,814 A | * | 5/1997 | Reeves et al. | 75/255 |
| 5,806,751 A | * | 9/1998 | Schaefer et al. | 228/119 |
| 6,187,450 B1 | * | 2/2001 | Budinger et al. | 428/546 |
| 6,365,285 B1 | * | 4/2002 | Chesnes | 428/668 |
| 6,530,971 B1 | | 3/2003 | Cohen et al. | |
| 6,968,991 B2 | * | 11/2005 | Renteria et al. | 228/262.3 |
| 7,416,108 B2 | * | 8/2008 | Philip | 228/248.1 |
| 2002/0185198 A1 | * | 12/2002 | Pietruska et al. | 148/528 |

FOREIGN PATENT DOCUMENTS

| | | |
|---|---|---|
| EP | 0353843 | 2/1990 |
| EP | 1226896 | 7/2002 |
| WO | 89/03740 | 5/1989 |
| WO | 02/50323 | 6/2002 |

* cited by examiner

*Primary Examiner*—Kiley Stoner
(74) *Attorney, Agent, or Firm*—Bachman & LaPointe, P.C.

(57) ABSTRACT

In accordance with the present invention, a process for repairing metal workpieces, such as turbine engine components, is provided. The process comprises the steps of forming a braze paste containing a first nickel base alloy material containing boron and chromium and a second nickel base alloy material containing chromium and cobalt, applying the brazing paste to an area of the metal workpiece containing at least one crack, and subjecting the workpiece and the brazing paste to a brazing cycle by heating the brazing paste and the workpiece, preferably to a temperature in the range of from 2000 to 2200 degrees Fahrenheit. During the brazing cycle, the brazing paste flows into and fills the at least one crack and thus repairs the metal workpiece.

2 Claims, No Drawings

REPAIR PROCESS

CROSS REFERENCE TO RELATED APPLICATION(S)

This application is a divisional application of U.S. patent application Ser. No. 11/292,743, filed Dec. 2, 2005, which is a divisional application of U.S. patent application Ser. No. 10/608,359, filed Jun. 26, 2003, entitled REPAIR PROCESS, By Monika D. Kinstler, now U.S. Pat. No. 7,017,793, issued Mar. 28, 2006.

BACKGROUND OF THE INVENTION

The present invention relates to a process for repairing cracks in metal workpieces and more particularly to a brazing paste used in said repair process.

Metal workpieces, such as turbine engine components, often encounter difficult work environments. As a result of the harshness of the work environments, cracks may develop in the workpieces over the course of their service life.

Over the years, many techniques have been developed to repair the cracks in such metal workpieces. These techniques include welding and brazing the metal workpieces to repair the cracks. Despite the existence of these techniques, there remains a need for more effective repair processes and repair products.

SUMMARY OF THE INVENTION

Accordingly, it is an object of the present invention to provide a process for repairing cracks in metal workpieces.

It is a further object of the present invention to provide a brazing paste for use in a process for repairing cracks in metal workpieces.

The foregoing objects are attained by the process and braze paste of the present invention.

In accordance with the present invention, a process for repairing metal workpieces, such as turbine engine components, is provided. The process comprises the steps of forming a braze paste containing a first nickel base alloy material containing boron and chromium and a second nickel base alloy material containing chromium and cobalt, applying the brazing paste to an area of the metal workpiece containing the cracks, and performing a brazing cycle by heating the brazing paste and the workpiece.

Further, in accordance with the present invention, a braze paste for use in the repair of cracks in metal workpieces broadly comprises a first nickel base alloy material containing boron and chromium and a second nickel base alloy material containing chromium and cobalt.

Other details of the repair process of the present invention, as well as other objects and advantages attendant thereto, are set forth in the following detailed description.

DETAILED DESCRIPTION OF THE PREFERRED EMBODIMENT(S)

In accordance with the present invention, a process for repairing cracks in a metal workpiece, such as a turbine engine component, is provided. The process broadly comprises forming a braze paste containing a first nickel base alloy material containing boron and chromium and a second nickel base alloy material containing chromium and cobalt, applying the brazing paste to an area of the metal workpiece containing the cracks, and performing a brazing cycle by heating the brazing paste and the workpiece. The brazing paste preferably contains from 20 wt % to 60 wt % of the first nickel base alloy material and the balance comprising the second nickel base alloy material. In a most preferred embodiment, the first nickel base alloy material and the second nickel base alloy material are present in a ratio of 1:1.

While it is preferred to form the braze paste using the aforementioned proportions of the first and second nickel base alloy materials, the braze paste can be formed with the second nickel based alloy material being mixed with a quantity of the first nickel based alloy material sufficient to cause adequate flow during the braze cycle.

In one embodiment of the present invention, the first nickel base alloy material preferably contains nickel as a major constituent and from 14 wt % to 16 wt % chromium and from 2.4 wt % to 3.0 wt % boron. An example of a suitable first nickel base alloy material is one having a composition consisting of from 14 to 16 wt % chromium, from 2.4 to 3.0 wt % boron, up to 0.15 wt % total other elements, and the remainder nickel and inevitable impurities.

The second nickel base alloy material preferably has a composition containing from 45 wt % nickel to 51 wt % nickel, from 22 wt % to 23 wt % chromium, and from 18.5 wt % to 19.5 wt % cobalt. An example of one such second nickel base alloy material is a nickel base alloy material consisting of from 22.0 wt % to 23.0 wt % chromium, from 18.5 wt % to 19.5 wt % cobalt, from 3.5 wt % to 4.0 wt % titanium, from 1.8 wt % to 2.2 wt % tungsten, from 1.7 wt % to 2.0 wt % aluminum, from 1.2 wt % to 1.5 wt % tantalum, from 0.8 wt % to 1.2 wt % niobium, from 0.13 wt % to 0.17 wt % carbon, up to 0.20 wt % manganese, up to 0.015 wt % phosphorous, up to 0.10 wt % copper, up to 0.25 wt % iron, up to 0.10 wt % silicon, up to 0.04 wt % zirconium, from 0.001 wt % to 0.008 wt % boron, up to 0.005 wt % sulfur, up to 0.005 wt % nitrogen, up to 0.003 wt % oxygen, up to 0.0005 wt % silver, up to 0.0005 wt % lead, up to 0.00005 wt % selenium, up to 0.00003 wt % bismuth, up to 0.00005 wt % tellurium, up to 0.00005 wt % thallium, and the balance nickel and inevitable impurities.

To form the braze paste, the first and second nickel base alloy materials are provided in powder form. The first and second nickel base alloy materials are then mechanically mixed to form the brazing paste. If desired, the first and second nickel base alloy materials may be mixed with a binder, such as Nicrobraze S binder, to form the brazing paste. Any suitable mechanical mixing means known in the art may be used to form the brazing paste.

The braze paste may be applied to an area of the workpiece containing the cracks using any suitable means known in the art. Prior to applying the braze paste, a crack to be filled may be cleaned of any debris using any suitable means known in the art.

After the braze paste has been applied to the area containing the crack(s) to be repaired, the braze paste and the workpiece are subjected to a brazing cycle during which the workpiece and the braze paste are heated to a temperature in the range of from 2000 degrees Fahrenheit to 2200 degrees Fahrenheit for a time period sufficient to cause the brazing paste to flow into and fill the crack(s). Any suitable means known in the art may be used to perform the brazing cycle at the above temperature range.

In some instances, it may be desirable to prefill the crack(s) with the second nickel base alloy material in powder form. This is because during the brazing cycle treatment, the first nickel base alloy material becomes liquid, while the second nickel base alloy material stays solid. The solid is carried along with the liquid when the mixture flows into a crack to be repaired.

The braze paste used in accordance with the present invention is advantageous in that it allows the repair of cracked components without causing undesirable metallurgical changes in the repair area or adjacent parent material.

The repair process of the present invention may be used to repair gas turbine engine components, both for flight and power generation applications.

While the metal workpieces being repaired may be formed from any suitable substrate material, such as nickel based alloys, the process of the present invention works particularly well when the workpiece is formed from the same material as that forming the second nickel base alloy.

It is apparent that there has been provided in accordance with the present invention a repair process which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A brazing paste for repairing cracks in a metal workpiece, said paste comprising a first nickel base alloy material containing boron and chromium and a second nickel base alloy material containing 22% to 23 wt % chromium, from 18.5 wt % to 19.5 wt % cobalt and from 3.5 to 4.0 wt % titanium, wherein said first nickel base alloy material contains nickel as a major constituent and from 14 wt % to 16 wt % chromium and from 2.4 wt % to 3.0 wt % boron.

2. A brazing paste for repairing cracks in a metal workpiece, said paste comprising a first nickel base alloy material containing boron and chromium and a second nickel base alloy material containing 22% to 23 wt % chromium, from 18.5 wt % to 19.5 wt % cobalt and from 3.5 to 4.0 wt % titanium, wherein said second nickel base alloy material consists of 22.0 to 23.0 wt % chromium, from 18.5 wt % to 19.5 wt % cobalt, from 3.5 to 4.0 wt % titanium, from 1.8 to 2.2 wt % tungsten, from 1.7 wt % to 2.0 wt % aluminum, from 1.2 to 1.5 wt % tantalum, from 0.8 to 1.2 wt % niobium, from 0.13 to 0.17 wt % carbon, up to 0.2 wt % manganese, up to 0.015 wt % phosphorous, up to 0.1 wt % copper, up to 0.25 wt % iron, up to 0.1 wt % silicon, up to 0.04 wt % zirconium, from 0.001 to 0.008 wt % boron, up to 0.005 wt % sulfur, up to 0.005 wt % nitrogen, up to 0.003 wt % oxygen, up to 0.0005 wt % silver, up to 0.0005 wt % lead, up to 0.00005 wt % selenium, up to 0.00003 wt % bismuth, up to 0.00005 wt % tellurium, up to 0.00005 wt % thallium, and the balance nickel and inevitable impurities.

* * * * *